(12) United States Patent
Schmid et al.

(10) Patent No.: US 12,018,393 B2
(45) Date of Patent: Jun. 25, 2024

(54) SEPARATORLESS DUAL GDE CELL FOR ELECTROCHEMICAL REACTIONS

(71) Applicant: Siemens Energy Global GmbH & Co. KG, Munich (DE)

(72) Inventors: Bernhard Schmid, Duren (DE); Christian Reller, Minden (DE); Günter Schmid, Hemhofen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 499 days.

(21) Appl. No.: 16/964,239

(22) PCT Filed: Jan. 18, 2019

(86) PCT No.: PCT/EP2019/051241
§ 371 (c)(1),
(2) Date: Jul. 23, 2020

(87) PCT Pub. No.: WO2019/158304
PCT Pub. Date: Aug. 22, 2019

(65) Prior Publication Data
US 2021/0040627 A1    Feb. 11, 2021

(30) Foreign Application Priority Data
Feb. 13, 2018   (DE) .................. 10 2018 202 184.8

(51) Int. Cl.
*C25B 11/031* (2021.01)
*C25B 1/04* (2021.01)
*C25B 9/17* (2021.01)

(52) U.S. Cl.
CPC ............. *C25B 11/031* (2021.01); *C25B 1/04* (2013.01); *C25B 9/17* (2021.01)

(58) Field of Classification Search
None
See application file for complete search history.

(56) References Cited

U.S. PATENT DOCUMENTS 4,240,882 A      12/1980  Ang et al.
5,019,224 A  *   5/1991   Denton .................... C25C 7/02
                                                        205/300

(Continued)

FOREIGN PATENT DOCUMENTS

CN          1643716 A      7/2005
CN        101434429 A      5/2009

(Continued)

OTHER PUBLICATIONS

Yamamoto et al, Production of syngas plus oxygen from CO2 in a gas-diffusion electrode-based electrolytic cell, Electrochimica Acta, vol. 47, No. 29, Aug. 2002, pp. 3327-3334 (Year: 2002).*

(Continued)

*Primary Examiner* — Harry D Wilkins, III
(74) *Attorney, Agent, or Firm* — Wolter Van Dyke Davis, PLLC

(57) ABSTRACT

An electrolysis cell, includes a cathode space with a cathode, an anode space with an anode, and a salt bridge space, which is arranged between the cathode and the anode, wherein the cathode space and the salt bridge space are delimited from one another by the cathode and the salt bridge space and the anode space are delimited from one another by the anode, and the cathode and the anode are formed as a gas diffusion electrode. An electrolysis plant has a corresponding electrolysis cell and a method for carries out electrochemical reactions with the electrolysis cell or electrolysis plant.

20 Claims, 5 Drawing Sheets

(56) References Cited

U.S. PATENT DOCUMENTS

| | | | |
|---|---|---|---|
| 5,246,551 A * | 9/1993 | Pletcher | C25B 1/16 205/510 |
| 5,635,039 A | 6/1997 | Cisar et al. | |
| 2005/0123816 A1 | 6/2005 | Gao et al. | |
| 2009/0045073 A1* | 2/2009 | Stone | C25B 1/02 205/638 |
| 2010/0187123 A1 | 7/2010 | Bocarsly et al. | |
| 2011/0120880 A1* | 5/2011 | Jiang | C25B 1/00 205/552 |
| 2012/0193222 A1* | 8/2012 | Mustain, Jr. | H01M 8/0668 502/328 |
| 2012/0228147 A1 | 9/2012 | Sivasankar et al. | |
| 2013/0146470 A1 | 6/2013 | Wang et al. | |
| 2013/0186771 A1* | 7/2013 | Zhai | C25B 9/19 205/440 |
| 2014/0027303 A1 | 1/2014 | Cole et al. | |
| 2014/0072836 A1* | 3/2014 | Mills | H01M 4/8626 429/422 |
| 2014/0102883 A1* | 4/2014 | Kamai | C01B 32/50 204/242 |
| 2015/0004510 A1* | 1/2015 | Bertier | H01M 8/04731 205/628 |
| 2017/0037522 A1 | 2/2017 | Kaczur et al. | |
| 2017/0321334 A1* | 11/2017 | Kuhl | C25B 13/08 |
| 2018/0127886 A1* | 5/2018 | Park | B01D 19/0084 |
| 2018/0195184 A1* | 7/2018 | Fleischer | C25B 15/083 |
| 2018/0230612 A1 | 8/2018 | Krause et al. | |
| 2018/0363151 A1* | 12/2018 | Swiegers | H01M 4/9016 |
| 2018/0363154 A1* | 12/2018 | Swiegers | H01M 8/04276 |
| 2019/0226105 A1 | 7/2019 | Eckert et al. | |
| 2019/0249317 A1 | 8/2019 | Schmid et al. | |

FOREIGN PATENT DOCUMENTS

| | | | |
|---|---|---|---|
| CN | 102912374 A | 2/2013 | |
| CN | 103160849 A | 6/2013 | |
| CN | 103649374 A | 3/2014 | |
| DE | 19954247 C2 | 5/2000 | |
| DE | 102013226357 A1 | 6/2015 | |
| DE | 102015215309 A1 | 2/2017 | |
| DE | 102016217989 A1 | 3/2018 | |
| DE | 102016218235 A1 | 3/2018 | |
| DE | 102017223521 A | 6/2019 | |
| KR | 101764797 B1 * | 8/2017 | C25B 1/04 |
| WO | 9852243 A1 | 11/1998 | |
| WO | WO-2015184388 A1 * | 12/2015 | C25B 1/02 |
| WO | WO 2017/005594 A1 * | 1/2017 | C25B 1/00 |

OTHER PUBLICATIONS

Machine translation of KR 101764797 (Year: 2017).*

Lu et al, A pH-differential dual-electrolyte microfluidic electrochemical cells forCO2 utilization, Renewable Energy, vol. 95, Sep. 2016, pp. 277-285 (Year: 2016).*

Ma et al, Efficient Electrochemical Flow System with Improved Anode for the Conversion of CO2 to CO, Journal of the Electrochemical Society, vol. 161, No. 10, Aug. 2014, pp. F1124-F1131 (Year: 2014).*

Hori Y: "Electrochemical CO2 Reduction on Metal Electrodes"; Modern Aspects of Electrochemistry, Springer, New York, 2008, pp. 89-189; 2008.

PCT International Search Report and Written Opinion of International Searching Authority dated May 13, 2019 corresponding to PCT International Application No. PCT/EP2019/051241 filed Jan. 18, 2019.

* cited by examiner

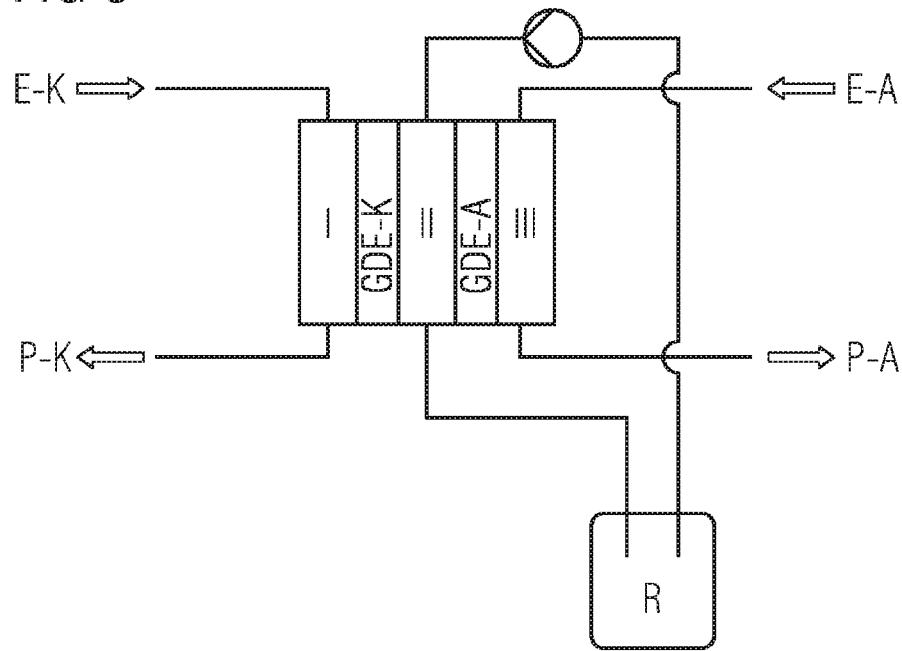
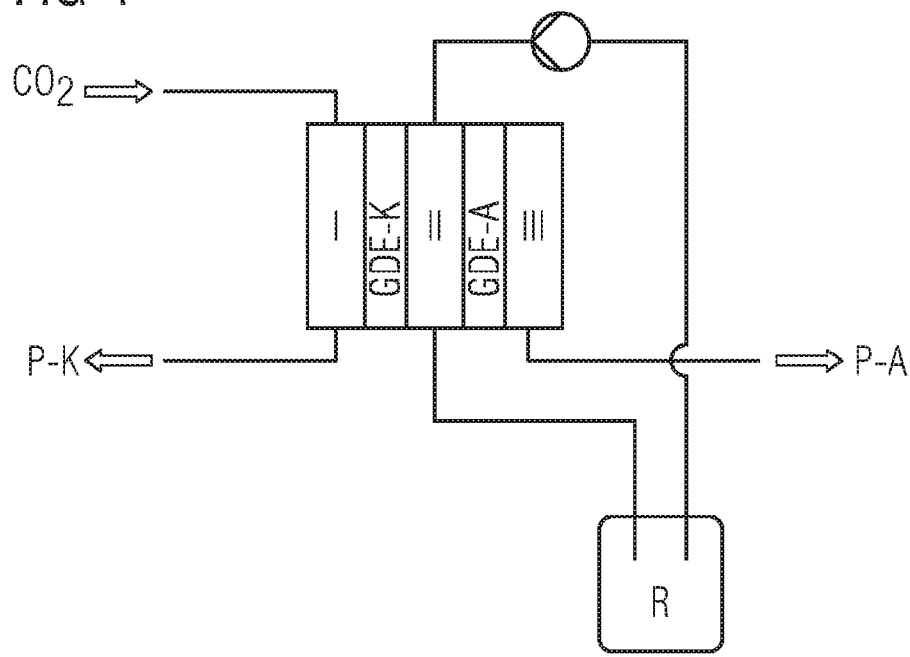

SEPARATORLESS DUAL GDE CELL FOR ELECTROCHEMICAL REACTIONS

CROSS REFERENCE TO RELATED APPLICATIONS

This application is the US National Stage of International Application No. PCT/EP2019/051241 filed 18 Jan. 2019, and claims the benefit thereof. The International Application claims the benefit of German Application No. DE 10 2018 202 184.8 filed 13 Feb. 2018. All of the applications are incorporated by reference herein in their entirety.

FIELD OF INVENTION

The present invention relates to an electrolysis cell comprising a cathode space comprising a cathode, an anode space comprising an anode, and a salt bridge space disposed between the cathode and anode, wherein the cathode space and the salt bridge space are delimited from one another by the cathode, and the salt bridge space and the anode space by the anode, and the cathode and the anode take the form of a gas diffusion electrode, to an electrolysis system comprising a corresponding electrolysis cell, and to methods of electrochemical conversion with the electrolysis cell or electrolysis system.

BACKGROUND OF INVENTION

The combustion of fossil fuels currently covers about 80% of global energy demand. These combustion processes emitted about 34 032.7 million metric tons of carbon dioxide ($CO_2$) globally into the atmosphere in 2011. This release is the simplest way of disposing of large volumes of $CO_2$ as well (brown coal power plants exceeding 50 000 t per day).

Discussion about the adverse effects of the greenhouse gas $CO_2$ on the climate has led to consideration of reutilization of $CO_2$. In thermodynamic terms, $CO_2$ is at a very low level and can therefore be reduced again to usable products only with difficulty.

In nature, $CO_2$ is converted to carbohydrates by photosynthesis. This process, which is divided up into many component steps over time and spatially at the molecular level, is copiable on the industrial scale only with great difficulty. The more efficient route at present compared to pure photocatalysis is the electrochemical reduction of the $CO_2$. A mixed form is light-assisted electrolysis or electrically assisted photocatalysis. The two terms can be used synonymously, according to the viewpoint of the observer.

As in the case of photosynthesis, in this process, $CO_2$ is converted to a higher-energy product (such as CO, $CH_4$, $C_2H_4$, etc.) with supply of electrical energy (optionally in a photo-assisted manner) which is obtained for example from renewable energy sources such as wind or sun. The amount of energy required in this reduction corresponds ideally to the combustion energy of the fuel and should advantageously only come from renewable sources. However, overproduction of renewable energies is not continuously available, but at present only at periods of strong insolation and strong wind. However, this is likely to change in the near future with the further rollout of sources of renewable energy.

The electrochemical reduction of $CO_2$ at solid-state electrodes in aqueous electrolyte solutions offers a multitude of possible products for which illustrative Faraday efficiencies at different metal cathodes are shown in table 1, taken from "Electrochemical $CO_2$ reduction on metal electrodes" by Y. Hori, published in: C. Vayenas, et al. (Eds.), Modern Aspects of Electrochemistry, Springer, New York, 2008, pp. 89-189.

TABLE 1

Faraday efficiencies in the electrolysis of $CO_2$ at various electrode materials

| Electrode | $CH_4$ | $C_2H_4$ | $C_2H_5OH$ | $C_3H_7OH$ | CO | $HCOO^-$ | $H_2$ | Total |
|---|---|---|---|---|---|---|---|---|
| Cu | 33.3 | 25.5 | 5.7 | 3.0 | 1.3 | 9.4 | 20.5 | 103.5 |
| Au | 0.0 | 0.0 | 0.0 | 0.0 | 87.1 | 0.7 | 10.2 | 98.0 |
| Ag | 0.0 | 0.0 | 0.0 | 0.0 | 81.5 | 0.8 | 12.4 | 94.6 |
| Zn | 0.0 | 0.0 | 0.0 | 0.0 | 79.4 | 6.1 | 9.9 | 95.4 |
| Pd | 2.9 | 0.0 | 0.0 | 0.0 | 28.3 | 2.8 | 26.2 | 60.2 |
| Ga | 0.0 | 0.0 | 0.0 | 0.0 | 23.2 | 0.0 | 79.0 | 102.2 |
| Pb | 0.0 | 0.0 | 0.0 | 0.0 | 0.0 | 97.4 | 5.0 | 102.4 |
| Hg | 0.0 | 0.0 | 0.0 | 0.0 | 0.0 | 99.5 | 0.0 | 99.5 |
| In | 0.0 | 0.0 | 0.0 | 0.0 | 2.1 | 94.9 | 3.3 | 100.3 |
| Sn | 0.0 | 0.0 | 0.0 | 0.0 | 7.1 | 88.4 | 4.6 | 100.1 |
| Cd | 1.3 | 0.0 | 0.0 | 0.0 | 13.9 | 78.4 | 9.4 | 103.0 |
| Tl | 0.0 | 0.0 | 0.0 | 0.0 | 0.0 | 95.1 | 6.2 | 101.3 |
| Ni | 1.8 | 0.1 | 0.0 | 0.0 | 0.0 | 1.4 | 88.9 | 92.4 |
| Fe | 0.0 | 0.0 | 0.0 | 0.0 | 0.0 | 0.0 | 94.8 | 94.8 |
| Pt | 0.0 | 0.0 | 0.0 | 0.0 | 0.0 | 0.1 | 95.7 | 95.8 |
| Ti | 0.0 | 0.0 | 0.0 | 0.0 | 0.0 | 0.0 | 99.7 | 99.7 |

There are currently discussions about the electrification of the chemical industry. This means that chemical commodities or fuels are to be produced advantageously from $CO_2$ (CO), $H_2O$ with supply of surplus electrical energy, advantageously from renewable sources. In the phase of introduction of such technology, the aim is for the economic value of a substance to be distinctly greater than its calorific value.

Electrolysis methods have undergone significant further development in the last few decades. PEM water electrolysis has been optimized to give high current densities. Large electrolyzers having outputs in the megawatt range are already being introduced onto the market.

However, $CO_2$ electrolysis still faces some further specific challenges. Firstly, unlike in the case of water electrolysis, the electrolyte medium and the substrate are not identical. Therefore, a functional $CO_2$ electrolyzer must normally cope with more components (additional gas feed). Secondly, the $CO_2$ substrate can also react with the electrolyte medium and form "adducts" with the charge carriers present therein, for example:

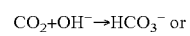

according to the pH in the mode of operation

The "$CO_2$" may therefore occur as different species, either charged or uncharged, in multiple or even in all streams of matter present in the electrolyzer. Similar problems can occur with other gases, for example in the generation of $O_2$ or the production of $H_2O$.

An efficient mass transfer concept has therefore typically been essential to date for $CO_2$ electrolysis.

SUMMARY OF INVENTION

It is therefore an object of the present invention to provide an electrolysis cell in which an efficient process regime can be achieved when a gas is being converted and/or generated.

The inventors have found that it is advantageous to execute both electrodes of an electrolysis cell as gas diffusion electrodes (GDEs) and indeed to operate them as such. This means that separators, especially membranes and diaphragms, that serve to separate product gases are superfluous since this function can now be assumed by the electrodes themselves. As a result, both the additional ionic conduction resistance of these separators, for example membranes, and any disruption of current flow or the insulation of parts of the electrode surface by the product gases in the form of gas bubbles can be avoided. This constitutes a major advantage of the cells having solid anodes or those having zero-gap lattice anodes.

In a first aspect, the present invention relates to an electrolysis cell comprising—a cathode space comprising a cathode;—an anode space comprising an anode; and—a salt bridge space disposed between the cathode and anode, wherein the cathode space and the salt bridge space are delimited from one another by the cathode, and the salt bridge space and the anode space by the anode, and the cathode and the anode take the form of a gas diffusion electrode, wherein the salt bridge space has no separator and wherein the cathode and the anode have no separator on the salt bridge space side, further comprising a first feed device for a first reactant gas which is connected to the cathode space and is designed to supply the cathode space with a first reactant gas, and/or a first removal device for a first product gas which is connected to the cathode space and is designed to remove a first product gas from the cathode space, and/or a second feed device for a second reactant gas which is connected to the anode space and is designed to supply the anode space with a second reactant gas, and/or a second removal device for a second product gas which is connected to the anode space and is designed to remove a second product gas from the anode space, a third feed device for an electrolyte which is designed to supply the salt bridge space with an electrolyte, and a third removal device for an electrolyte which is designed to remove an electrolyte from the salt bridge space.

The present invention further relates to an electrolysis system comprising the electrolysis cell of the invention.

Additionally disclosed are a method of electrochemical conversion of at least one reactant gas in an electrolysis cell of the invention or an electrolysis system of the invention, wherein at least one reactant gas is supplied to a cathode space and/or anode space of the electrolysis cell, and a method of generating at least one product gas in an electrolysis cell of the invention or an electrolysis system of the invention, wherein at least one product gas is produced from an electrolyte in the salt bridge space and removed from the cathode space and/or the anode space.

Further aspects of the present invention can be inferred from the dependent claims and the detailed description.

BRIEF DESCRIPTION OF THE DRAWINGS

The appended drawings are intended to illustrate embodiments of the present invention and impart further understanding thereof. In association with the description, they serve to explain concepts and principles of the invention. Other embodiments and many of the advantages mentioned are apparent with regard to the drawings. The elements of the drawings are not necessarily shown true to scale with respect to one another. Elements, features and components that are the same, have the same function and the same effect are each given the same reference numerals in the figures of the drawings, unless stated otherwise.

FIGS. 2 to 4, by contrast, show schematics of electrolysis cell arrangements of the invention.

DETAILED DESCRIPTION OF INVENTION

Figure 1:
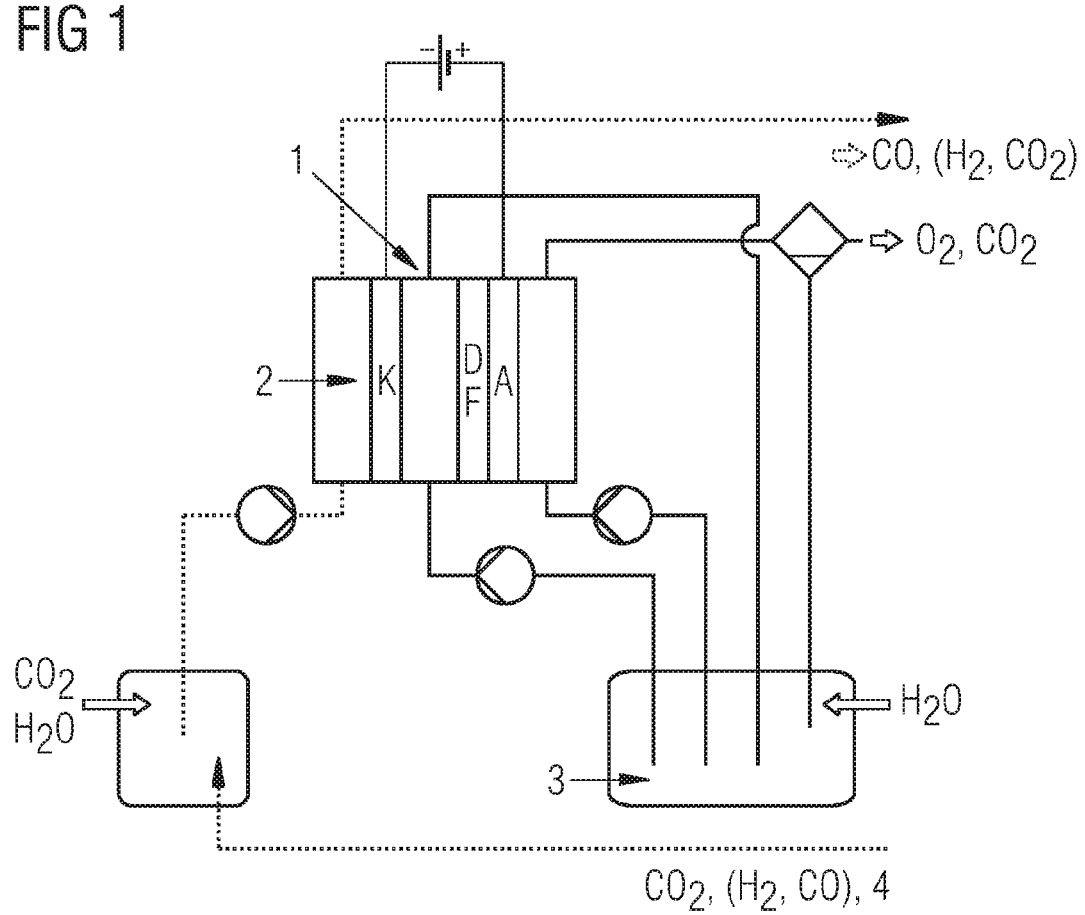
FIG. 1 shows a schematic of a prior art electrolysis cell arrangement.

Unless defined differently, technical and scientific expressions used herein have the same meaning as commonly understood by a person skilled in the art in the specialist field of the invention.

Figures given in the context of the present invention relate to % by weight, unless stated otherwise or apparent from the context. In the gas diffusion electrode of the invention, the percentages by weight add up to 100% by weight.

"Hydrophobic" in the context of the present invention is understood to mean water-repellent. According to the invention, hydrophobic pores and/or channels are thus those that repel water. More particularly, hydrophobic properties are associated in accordance with the invention with substances or molecules having nonpolar groups.

"Hydrophilic", by contrast, is understood to mean the ability to interact with water and other polar substances.

Gas diffusion electrodes (GDE) in general are electrodes in which liquid, solid and gaseous phases are present, and where a conductive catalyst in particular can catalyze an electrochemical reaction between the liquid and gaseous phases.

The catalyst can be executed in different ways, for example as a porous "all-active material catalyst", optionally with auxiliary layers to adjust the hydrophobicity; or in the form of a conductive porous carrier to which a catalyst may be applied in a thin layer.

In the context of this invention, a gas diffusion electrode (GDE) is especially a porous electrode having an interior in which gases can move by diffusion. It serves in each case to separate the anode space and the cathode space from the salt bridge space. It is especially designed, in particular embodiments, to separate a gas space and an electrolyte space from one another. It also has the particular feature, in particular embodiments, that product gases can exit from these gas diffusion electrodes on the opposite side from the counterelectrode, i.e. into the cathode space and/or the anode space. These gaseous products may originate, for example, from a liquid or dissolved reactant (liquid-to-gas electrolysis, e.g. $2H_2O \rightarrow O_2 + 4H^+ + 4e^-$) or form from a gaseous reactant that has especially penetrated into the electrode from its opposite side from the counterelectrode (gas-to-gas electrolysis, e.g. $2CO_2 \rightarrow CO+CO_3^{2-}$). It is not necessary in the context of this invention for the GDE to be gas-permeable through its plane since no passage of the gases into the electrolyte is required, nor does it occur in particular embodiments—i.e. there is no flow-through arrangement. Liquid and/or dissolved products and/or by-products of the electrochemical conversion, especially the charge carriers generated, may be released by the electrode into the electrolyte. If the main product of the electrochemical conversion should be liquid or dissolved at the GDE, this can be transferred from the electrode into the electrolyte (gas-to-liquid electrolysis, e.g. $CO_2+2H_2O+2e \rightarrow HCOOH+2OH^-$).

Standard pressure is 101 325 Pa=1.01325 bar.

Electroosmosis: Electroosmosis is understood to mean an electrodynamic phenomenon in which a force toward the cathode acts on particles having a positive zeta potential that are present in solution and a force toward the anode on all particles having negative zeta potential. If conversion takes place at the electrodes, i.e. a galvanic current flows, there is also a flow of matter of the particles having positive zeta potential to the cathode, irrespective of whether or not the species is involved in the conversion. The same is true of a negative zeta potential and the anode. If the cathode is porous, the medium is also pumped through the electrode. This is also referred to as an electroosmotic pump.

The flows of matter resulting from electroosmosis can also flow counter to concentration gradients. Diffusion-related flows that compensate for the concentration gradients can be overcompensated as a result.

A separator in the context of the invention is a barrier, for example a layer, that can accomplish a spatial and, at least to some degree, also physical separation between different spaces in the electrolysis cell, for example anode space, salt bridge space, cathode space, and also electrical separation between anode and cathode, but permits ion transport between the different spaces. A separator especially does not have a fixed assigned potential like an electrode does. Moreover, a separator in particular embodiments is especially a barrier in two-dimensional form with uniform surface coverage. More particularly, membranes and diaphragms should be regarded as separators. Thus, in an electrolysis cell of the invention, the salt bridge space especially does not have any membrane and any diaphragm, and the cathode and anode additionally do not have any membrane and any diaphragm on either side of the salt bridge space.

In particular embodiments, the electrolysis cell of the invention does not comprise a fixed two-dimensional layer with ion transport at a fixed location, especially in "incorporated" form. The ion transport function may be taken on by the electrolyte itself in the electrolysis cell of the invention.

Separators can bring crucial disadvantages for cell operation through charge carrier accumulation in the electrolyte substreams. This is the case especially when the electrolyte includes ions that are not broken down at the electrodes (anode and/or cathode) and/or the separator has unfavorably low or zero ion selectivity. In the course of passage of the electrolyte streams, it is then possible for cations to pass over into the catholyte (electrolyte stream that comes into contact with the cathode) and/or anions into the anolyte (electrolyte stream that comes into contact with the cathode). Counterions for these charge carriers are then generated by the electrodes. As a result, the electrolytes have a different composition on exit from the cell than on entry. This can become problematic especially in the case of very large cells. In the present dual GDE cell concept with just one electrolyte stream in particular, no such problems can occur in particular embodiments.

Furthermore, especially in particular embodiments, the presence of gastight separators or other gas separation devices such as gastight frits in the salt bridge space is ruled out.

In a first aspect, the present invention relates to an electrolysis cell comprising—a cathode space comprising a cathode; —an anode space comprising an anode; and—a salt bridge space disposed between the cathode and anode, wherein the cathode space and the salt bridge space are delimited from one another by the cathode, and the salt bridge space and the anode space by the anode, and the cathode and the anode take the form of a gas diffusion electrode, wherein the salt bridge space has no separator and wherein the cathode and the anode have no separator on the salt bridge space side.

The term "salt bridge space" is used here with regard to its function of acting as a "bridge" between anode or anode arrangement and cathode or cathode arrangement, and in this context of having cations and anions which, however, need not form salts in the present case. This could also be named as ion bridge space with regard to its function of exchanging charge by means of ions between anode and cathode. Since this term is unfamiliar, however, the space is referred to in accordance with the invention as salt bridge space, even if no salt in the conventional sense need be present therein.

The dimensions of the salt bridge space are not particularly restricted, and it may take the form, for example, of a gap between the anode and the cathode, which are arranged parallel to one another, for example.

The cathode space, the anode space and salt bridge space in the electrolysis cell of the invention are not particularly restricted in terms of shape, material, dimensions, etc., provided that they can accommodate the cathode and the anode and they are delimited from one another, i.e. spatially separated, by the anode and cathode, with possible physical contact within the gas diffusion electrode through the pores of the cathode and anode as gas diffusion electrodes.

In respect of the individual spaces, it is possible here, according to the electrolysis to be conducted, to correspondingly provide feed and removal devices for reactants and products, for example in the form of liquid, gas, solution, suspension, etc., where these may optionally also be recycled in each case. Nor is there any restriction in this regard, and it is also possible for the flow through the individual spaces to be in parallel or in countercurrent. For example, in the case of electrolysis of $CO_2$—where this may also still contain CO, i.e. contains at least 20% by volume of $CO_2$, for example, this is supplied to the cathode as gas—for example in countercurrent to an electrolyte stream in the salt bridge space in the case of a three-chamber construction. There is no restriction here.

Corresponding feed options also exist in the anode space, and are also set out in detail hereinafter. The respective feed may be provided in either continuous or discontinuous form, for example pulsed, etc., for which pumps, valves, etc. may correspondingly be provided in an electrolysis system of the invention—which are also discussed hereinafter, as are cooling and/or heating devices, in order to be able to catalyze correspondingly desired reactions at the anode and/or cathode. In advantageous embodiments, the anode space and the cathode space comprise essentially only gaseous substrates, advantageously solely gaseous substrates, i.e. gaseous reactants and/or products, such that the corresponding feed devices and/or removal devices, if present, are designed to feed and/or remove gaseous substances, and/or liquid substrates, i.e. liquid reactants and/or products, are fed and removed via the electrolyte in the salt bridge space, such that the corresponding feed device and/or removal device is set up to feed and/or remove liquid electrolytes, for example aqueous electrolytes.

The materials in the respective spaces or the electrolysis cell and/or the further constituents of the electrolysis system may also be suitably matched correspondingly here to desired reactions, reactants, products, electrolytes, etc. Furthermore, at least one power source per electrolysis cell is of course also included. Further apparatus parts that occur in electrolysis cells and electrolysis systems may also be provided in the electrolysis system of the invention or the electrolysis cell. In particular embodiments, the single cells are used to form a stack comprising 2-1000, advantageously 2-200, cells, and the operating voltage thereof is advantageously in the range of 3-1500 V, more advantageously 200-600 V.

In particular embodiments, the salt bridge space, for stabilization and to assure force-fitting, for example in a stack, may comprise a filling medium in non-self-contained form, for example in the form of a bed, of a knit, of an elastic element, of a network, of a porous structure, for example in spongelike form, and/or of a porous self-supporting structure, for example in regular form. This filling medium may also have been further functionalized, for example acidically and/or basically, in order to suitably establish a pH of the electrolyte in the salt bridge space and/or to improve electrolyte transport in the salt bridge space and/or to further react any ions formed, for example $HCO_3^-$ ions in $CO_2$ electrolysis, as a result of which $CO_2$ can in turn be recovered and optionally recycled.

According to the invention, the cathode is not particularly restricted, provided that it is in the form of a gas diffusion electrode, and may be matched to a desired half-reaction, for example with regard to the reaction products. The cathode may have a single-layer or multilayer structure and may include a suitable material as catalyst for electrochemical conversion of a reactant at the cathode, especially of at least one gaseous reactant. It is of course also possible to convert a material in the salt bridge space at the cathode to a gas that can then escape through the cathode space, for example in the case of electrolysis of water to $H_2$.

A cathode for reduction of $CO_2$ and optionally CO may comprise, for example, a metal such as Cu, Ag, Au, Zn, Pb, Sn, Bi, Pt, Pd, Ir, Os, Fe, Ni, Co, W, Mo, etc., or mixtures and/or alloys thereof, advantageously Cu, Ag, Au, Zn, Pb, Sn, or mixtures and/or alloys thereof and/or a salt thereof, where suitable materials may be matched to a desired product. A catalyst may thus be chosen according to the desired product. In the case of reduction of $CO_2$ to CO, for example, the catalyst is advantageously based on Ag, Au, Zn and/or compounds thereof such as $Ag_2O$, AgO, $Au_2O$, $Au_2O_3$, ZnO. For preparation of hydrocarbons, advantage is given to Cu or Cu-containing compounds such as $Cu_2O$, CuO and/or copper-containing mixed oxides with other metals, etc. For preparation of formic acid, for example, catalysts based on Pb, Sn and/or Cu, especially Pb, Sn, are possible.

The cathode is the electrode where the reductive half-reaction takes place. It may be in single-layer or multilayer form as a gas diffusion electrode. The gas diffusion electrode may take the form, for example, of a porous catalyst structure optionally having at least one binder; of a composite having a porous catalyst structure; of a porous, conductive, catalytically inactive structure, e.g. carbon-paper GDL (gas diffusion layer), carbon-cloth GDL, and/or polymer-bound film composed of granular glassy carbon impregnated with the cathode catalyst; of a particulate catalyst that has been applied by means of a suitable ionomer to a suitable support, for example a porous conductive support; of a porous conductive support impregnated with a suitable catalyst; of a non-ion-conductive gas diffusion electrode that has subsequently been impregnated with a suitable ionomer, for example an anion-conductive ionomer, for example especially for a $CO_2$ electrolysis; etc.

In addition, the cathode may also display open-pore ion-conductive layers on the electrolyte side of the GDE, for example for protection of the catalyst from mechanical erosion, for example in the form of an open-pore bound layer of a particulate ion exchanger. In particular embodiments, the cathode does not have any self-contained ion-conductive layers.

Various combinations of the above-described electrode structures are also possible as cathode.

The corresponding cathodes here may also contain materials that are customary in cathodes, such as binders, ionomers, for example anion-conductive ionomers, fillers, hydrophilic additives, etc., which are not particularly restricted. As well as the catalyst, the cathode may thus, in particular embodiments, contain at least one support material, for example a conductive support material (e.g. a metal such as titanium), and/or at least one nonmetal such as carbon, Si, boron nitride (BN), boron-doped diamond, etc., and/or at least one conductive oxide such as indium tin oxide (ITO), aluminum zinc oxide (AZO) or fluorinated tin oxide (FTO)—for example as used for production of photoelectrodes, and/or at least one polymer based on polyacetylene, polyethoxythiophene, polyaniline or polypyrrole, for example in polymer-based electrodes; (also possible are nonconductive supports, for example polymer meshes, for example in the case of adequate conductivity of the catalyst layer), binders (e.g. hydrophilic and/or hydrophobic polymers, e.g. organic binders, for example selected from PTFE (polytetrafluoroethylene), PVDF (polyvinylidene difluoride), PFA (perfluoroalkoxy polymers), FEP (fluorinated ethylene-propylene copolymers), PFSA (perfluorosulfonic acid polymers), and mixtures thereof, especially PTFE), conductive fillers (e.g. carbon), nonconductive fillers (e.g. glass) and/or hydrophilic additives (e.g. $Al_2O_3$, $MgO_2$, hydrophilic materials such as polysulfones, e.g. polyphenylsulfones, polyimides, polybenzoxazoles or polyetherketones, or generally polymers that are electrochemically stable in the electrolyte, polymerized "ionic liquids", and/or organic conductors such as PEDOT:PSS or PANI (camphorsulfonic acid-doped polyaniline), which are not particularly restricted.

The anode is likewise also a gas diffusion electrode. It is additionally likewise not particularly restricted in accordance with the invention and may be matched to a desired half-reaction, for example with regard to the reaction products. At the anode, which is electrically connected to the cathode by means of a power source for provision of the voltage for the electrolysis, the oxidation of a substance takes place in the anode space. Furthermore, the anode material is not particularly restricted and depends primarily on the desired reaction. The anode, like the cathode, may have a single-layer or multilayer structure and may include a suitable material as catalyst for electrochemical conversion of a reactant at the anode, especially at least one gaseous reactant. It is of course also possible to convert a material in the salt bridge space at the anode to a gas that can then escape through the anode space, for example in the case of an electrolysis of water to $O_2$.

Illustrative anode materials include platinum or platinum alloys, palladium or palladium alloys, and glassy carbon, iron, nickel, etc. Further anode materials are also conductive oxides such as doped or undoped $TiO_2$, indium tin oxide (ITO), fluorine-doped tin oxide (FTO), aluminum-doped zinc oxide (AZO), iridium oxide, etc. It is also optionally possible for these catalytically active compounds to be applied solely superficially by thin-film methodology, for example on a titanium and/or carbon support. The anode catalyst is not particularly restricted. Catalysts used for $O_2$ or $Cl_2$ production may, for example, also be $IrO_x$ ($1.5<x<2$) or $RuO_2$. These may also be in the form of a mixed oxide with other metals, e.g. $TiO_2$, and/or be supported on a conductive material such as C (in the form of conductive black, activated carbon, graphite, etc.). It is alternatively also possible to use catalysts based on Fe—Ni or Co—Ni for $O_2$ production.

The anode is the electrode where the oxidative half-reaction takes place. It may be in single-layer or multilayer form as a gas diffusion electrode. The gas diffusion electrode may take the form, for example, of a porous catalyst structure optionally having at least one binder; of a composite having a porous catalyst structure; of a porous, conductive, catalytically inactive structure, e.g. carbon-paper GDL (gas diffusion layer), carbon-cloth GDL, and/or polymer-bound film composed of granular glassy carbon impregnated with the cathode catalyst; of a particulate catalyst that has been applied by means of a suitable ionomer to a suitable support, for example a porous conductive support; of a porous conductive support impregnated with a suitable catalyst; of a non-ion-conductive gas diffusion electrode that has subsequently been impregnated with a suitable ionomer, for example an anion-conductive or cation-conductive ionomer; etc.

In addition, the anode may also display open-pore ion-conductive layers on the electrolyte side of the GDE, for example for protection of the catalyst from mechanical erosion, for example in the form of an open-pore bound layer of a particulate ion exchanger. In particular embodiments, the anode does not have any open-pore ion-conductive layers. In particular embodiments, neither the cathode nor the anode has any self-contained ion-conductive layers.

Here too, various combinations of the different anode structures are possible.

The corresponding anodes may likewise contain materials that are customary in anodes, such as binders, ionomers, for example including cation-conducting ionomers, for example containing sulfonic acid and/or phosphonic acid groups, fillers, hydrophilic additives, etc., which are not particularly restricted, and which have also been described above, for example, for the cathode. As well as the catalyst, the anode may thus, in particular embodiments, contain at least one support material, for example a conductive support material (e.g. a metal such as titanium), and/or at least one nonmetal such as carbon, Si, boron nitride (BN), boron-doped diamond, etc., and/or at least one conductive oxide such as indium tin oxide (ITO), aluminum zinc oxide (AZO) or fluorinated tin oxide (FTO)—for example as used for production of photoelectrodes, and/or at least one polymer based on polyacetylene, polyethoxythiophene, polyaniline or polypyrrole, for example in polymer-based electrodes; (also possible are nonconductive supports, for example polymer meshes, for example in the case of adequate conductivity of the catalyst layer), binders (e.g. hydrophilic and/or hydrophobic polymers, e.g. organic binders, for example selected from PTFE (polytetrafluoroethylene), PVDF (polyvinylidene difluoride), PFA (perfluoroalkoxy polymers), FEP (fluorinated ethylene-propylene copolymers), PFSA (perfluorosulfonic acid polymers), and mixtures thereof, especially PTFE), conductive fillers (e.g. carbon), nonconductive fillers (e.g. glass) and/or hydrophilic additives (e.g. $Al_2O_3$, $MgO_2$, hydrophilic materials such as polysulfones, e.g. polyphenylsulfones, polyimides, polybenzoxazoles or polyetherketones, or generally polymers that are electrochemically stable in the electrolyte, polymerized "ionic liquids", and/or organic conductors such as PEDOT: PSS or PANI (camphorsulfonic acid-doped polyaniline), which are not particularly restricted.

In particular embodiments, the anode and/or the cathode are contacted by a conductive structure. The conductive structure here is not particularly restricted. This may comprise, for example, carbon nonwovens, metal foams, metal knits, expanded metals, graphite structures or metal structures.

For some of the electrochemical conversions at the catalyst electrodes, the presence of water is advantageous. e.g. $3CO_2+H_2O+2e^-\rightarrow CO+2HCO_3^-$ or according to pH: $2CO_2+2e^-\rightarrow CO+CO_3^{2-}$ Therefore, the anode and/or cathode in particular embodiments have sufficient hydrophilicity at least on a side facing the salt bridge space. This hydrophilicity may optionally be adjusted by hydrophilic additives such as $TiO_2$, $Al_2O_3$, or other electrochemically inert metal oxides, etc.

As described above, the anode and/or cathode may have a single-layer or multilayer structure. Examples of layers that may be present in the cathode and/or anode as gas diffusion electrode are elucidated hereinafter. These may be formed by extruding, calendering, pressing, casting, knife-coating, etc., for example onto an electrical contact or a further layer—as described above and hereinafter.

If the anode and/or cathode is constructed as a single-layer electrode, the layer may, for example, be an extruded, calendered, pressed or cast porous layer comprising at least one electrochemically active catalyst as specified above by way of example, for example in powder form, and at least one binder, likewise as specified above. In addition, this layer may also contain further additives for adjusting hydrophilic and/or hydrophobic properties, for improving electrical conductivity, for improving ionic conductivity, mechanical or electrical support structures and/or filler materials, as specified above. It would also be possible to use the catalyst here on a support, for example, likewise as specified above by way of example. The amount of catalyst here is not particularly restricted and for example 5-10% loading.

When the cathode and/or anode takes the form of a multilayer GDE, it may contain the layers which follow, for example.

Hydrophobic layer as gas diffusion layer: This layer, if present—for example when there is no further layer in the GDE that can prevent passage of gas into the salt bridge space—is advantageously not electrochemically active, hydrophobic and not ion-conductive. It serves to transport gaseous reactants into the electrochemically active layer and to transport gaseous products out of the active layer, and for electrical contacting of the active catalyst layer. It may also additionally function as a barrier layer against the electro-osmotic pumping of electrolyte ions. In particular embodiments, the hydrophobic layer is the structure-imparting component of the GDE and therefore also the thickest layer, advantageously with a thickness of 50-1000 μm, further advantageously 100-500 μm, e.g. 200-300 μm. The use thereof is therefore also advisable particularly for GDEs containing very costly catalysts.

Active layer: This layer contains the active electrocatalyst and is advantageously both electrically conductive and ion-conductive. The catalyst loading in the active layer is not particularly restricted and may, for example, be 0.5-10 mg/cm$^{-2}$, advantageously 1-4 mg/cm$^{-2}$. It is advantageous when this layer is intrinsically ion-conductive for the charge carriers formed in the electrochemical conversion. This drastically reduces the penetration of electrolyte into this layer and improves the transport of excess charge out of the electrode. In particular embodiments, the active layer is hydrophilic in respect of good wetting with an aqueous electrolyte, which can be adjusted, for example, by use of corresponding binders and/or additives. The surface of this layer may also be hydrophobically modified in particular embodiments toward the electrolyte in the salt bridge space to improve the separation of gas and electrolyte. The active layer is porous and not gastight. In particular embodiments, this layer is thinner than the hydrophobic layer, with a thickness, for example, of 5-500 µm, e.g. 10-300 µm, e.g. 20-200 µm.

Porous layer comprising an ion exchange material as ion transport and charge carrier creation layers: This layer, if present, in particular embodiments, forms the boundary from the electrolyte in the salt bridge space, adjoining the active layer. The layer serves to improve charge carrier exchange between the active layer of the GDE and the electrolyte. In addition, it may fulfill a function of protecting the active layer from erosion or flooding with the electrolyte. The layer is advantageously intrinsically ion-conductive, but is not a separator by virtue of its porosity, which, by comparison with a separator, entails a distinctly reduced electrical resistance. In the porous layer comprising an ion exchange material, it is possible to match the mode of ion conduction specifically to the demands of the conversion that proceeds in the active layer. It is also possible for multiple ion exchange materials to be present, which will be set out further hereinafter.

The porous layer comprising an ion exchange material may serve, for example, to transport charge carriers generated in the active layer away and simultaneously to block alternative unwanted transport pathways by counterions.

The electrochemical conversion of carbon dioxide at a cathode is governed, for example, by the following equation:

$$3CO_2 + 2e^- + H_2O \rightarrow CO + 2HCO_3^{2-}$$

If charge carriers are destroyed at and/or in the active layer, the porous layer comprising an ion exchange material can improve the supply of these species.

$$4HCO_3^- \rightarrow O_2 + 4CO_2 + 4e^-$$

For adjustment of the charge transport pathway, the porous layer comprising an ion exchange material may also be designed to generate new charge carriers from neutral species, for example by dissociation or auto-protolysis.

$$H_2O \rightarrow OH^- + H^+$$

In particular embodiments, neither the cathode nor the anode comprises a porous layer comprising an ion exchange material, in order to further reduce the electrical resistance of the electrode and to further simplify the construction.

Particular embodiments and arrangements with the above layers are set out in more detail hereinafter.

In particular embodiments, the cathode and/or anode have at least one active layer comprising an electrocatalyst as specified above by way of example. In the active layer, the electrocatalyst may be introduced, for example, into a suitable binder that has been described above and with which the hydrophilicity/hydrophobicity of the layer can be suitably adjusted for transport of a gas and/or a liquid.

In particular embodiments, the cathode and/or the anode have a single- or multilayer structure with the at least one active layer. For example, however, it is also possible for this to be adjoined by a hydrophobic layer for contacting of the cathode space and/or the anode space.

In particular embodiments, the cathode and/or anode consists of the active layer. In particular embodiments, the active layer, especially in the case of a single-layer structure composed of the active layer, comprises a hydrophobic binder that enables good contacting of the cathode space and/or anode space, for example for supply of a gaseous reactant and/or removal of a gaseous product.

In particular embodiments, the cathode has a hydrophobic layer as specified above on the cathode space side and/or the anode has one on the anode space side. This can improve the supply of a gaseous reactant to the cathode space and/or anode space and/or the removal of a gaseous product therefrom. This is advantageous especially in the case of a two-layer structure of the cathode and/or anode with hydrophobic layer and active layer, in which case the active layer can also be suitably adjusted with regard to hydrophilicity for good contacting of an electrolyte of the salt bridge space.

In particular embodiments, the cathode has a hydrophobic layer on the cathode space side and/or the anode has a hydrophobic layer on the anode space side, even in the case of a multilayer structure. It is possible here for the hydrophobic layer to adjoin the active layer. On the other side of the active layer toward the salt bridge space, it is then also possible, for example, for there to be an adjoining layer for contacting of the electrolyte of the salt bridge space and/or a layer for removal of ions formed in the electrolysis, but one which is not in the form of a separator and is especially not two-dimensional.

In particular embodiments, the cathode and/or the anode each comprise a porous layer comprising an ion exchange material, which is not particularly restricted, on the salt bridge space side, wherein the porous layer on the cathode advantageously contains an anion exchanger and/or the porous layer on the anode advantageously contains a cation exchanger. However, these layers do not comprise the ion exchange material in such a way that is in two-dimensional form. For example, such an ion exchange material may be provided solely in the pores of the porous layer and/or else in pores of the active layer. The cathode may comprise, for example, at least one ionomer, for example an anion-conductive or anion-transporting ionomer (e.g. anion exchange resin, anion transport resin), which may comprise, for example, various functional groups for ion exchange, which may be the same or different, for example tertiary amine groups, alkylammonium groups and/or phosphonium groups, and/or the anode may comprise at least one ionomer, for example a cation-conductive or cation-transporting ionomer (e.g. cation exchange resin, cation transport resin), which may comprise, for example, various functional groups for ion exchange, which may be the same or different, for example sulfonates, phosphonates, carboxylates and/or quaternary borates.

In particular embodiments, the cathode and/or the anode does not comprise any ion exchange material, and, in particular, neither the cathode nor the anode comprises any ion exchange material.

In an electrolysis cell of the invention, as also in the methods of the invention, the electrodes mentioned above by way of example may be combined with one another as desired.

In the electrolysis cell of the invention, it is of course also possible to employ commercially available GDEs as anode and/or cathode. For example, it is possible to use GDEs for water oxidation on the anode side from Uhde DeNora or generally all fuel cell manufacturers.

In particular embodiments, the electrolysis cell of the invention further comprises a first feed device for a first reactant gas which is connected to the cathode space and is designed to supply the cathode space with a first reactant gas, and/or a first removal device for a first product gas which is connected to the cathode space and is designed to remove a first product gas from the cathode space, and/or a second feed device for a second reactant gas which is connected to the anode space and is designed to supply the anode space with a second reactant gas, and/or a second removal device for a second product gas which is connected to the anode space and is designed to remove a second product gas from the anode space.

The individual feed and/or removal devices here are not particularly restricted and may be designed as described above. Whether there is a feed and/or removal device in the cathode space and/or anode space depends on the respective half-reaction at cathode and/or anode. If, for example, no gas is converted, no gas supply is required, for example when a gas is formed from an electrolyte in the salt bridge space and is removed. When a gas is converted to a liquid and/or a substance that dissolves in the electrolyte, again, no removal device in the respective electrode space is required. But it is of course possible that the cathode space and/or anode space in each case has a feed and removal device, such that it is possible both to feed a reactant through the cathode space and/or anode space to the cathode and/or anode and to remove a product from the cathode space and/or anode space. It is thus possible to provide the first feed device and the first removal device and/or the second feed device and the second removal device. Combinations of the above arrangements are also possible.

In particular embodiments, the electrolysis cell of the invention further comprises a third feed device for an electrolyte, which is designed to supply the salt bridge space with an electrolyte, and/or a third removal device for an electrolyte, which is designed to remove an electrolyte from the salt bridge space. These are advantageously present even in the case of aqueous electrolytes, in order, for example, to be able to compensate for water entrained in a product gas and/or to balance out the fluctuations in concentration. It may nevertheless also be the case that the electrolyte is consumed, for example in an anodic electrolysis of water to $O_2$, such that supply of electrolyte only may be sufficient. Water can likewise also be formed in an electrolysis, for example, such that only removal of electrolyte may be required. There are also conceivable reactions where electrolyte need not be supplied or removed, e.g. $CO_2 + SO_2 \rightarrow CO + SO_3$ In the electrolysis cell of the invention, in particular embodiments, at least one fluid medium (liquid or gaseous) flows through the cathode space, the anode space and/or the salt bridge space, advantageously all three chambers. In particular embodiments, however, the anode space and/or cathode space, especially both, however, have essentially only a gaseous reactant and/or product, i.e. no liquid, and so the material should be chosen correspondingly. More particularly, the side of the cathode and/or anode facing the cathode space and/or the anode space is thus not flushed with electrolyte.

Figure 2:
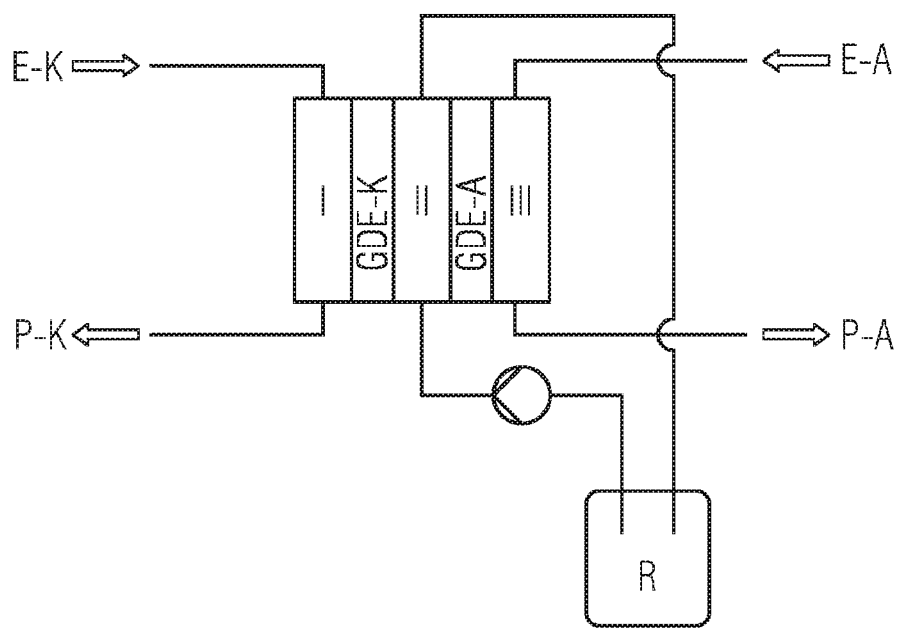

Illustrative arrangements of electrolysis cells of the invention with periphery are shown in FIGS. 2 to 4 and compared to a prior art electrolysis system in FIG. 1.

FIG. 1 shows an electrolysis cell in which an electrolysis cell 1 has a cathode K and an anode A, and also a diaphragm DF at the anode. The system shown in FIG. 1 is here by way of example with a $CO_2$ conversion to CO—with $H_2$ as by-product and unconverted $CO_2$, which are removed from the electrolysis cell for further processing and, after further processing, recycled with a majority of $CO_2$, and also $H_2$, CO and further products 4. For further conversion, $CO_2$ and $H_2O$ are supplied again for moistening. On the anode side, $H_2O$ is converted to $O_2$, it being possible for $CO_2$ to pass through as well on the anode side and be removed together with the $O_2$. In the in FIG. 1, for a stable mode of operation, the anolyte on the anode side and the electrolyte between cathode K and diaphragm DF are fed from a common reservoir 3 and mixed again after passing through the cell, in order to keep pH, cation concentration and anion concentration permanently constant.

By contrast, in the concept described here, in particular embodiments, only one electrolyte circuit is required, and so measures for assurance of ion transport can be dispensed with.

FIG. 2 shows, by way of example, a schematic of a present electrolysis cell which, owing to the two GDEs present, can also be referred to as a dual GDE cell.

The dual GDE cell shown in FIG. 2 consists of three chambers—the cathode space I, the salt bridge space II, and the anode space III, which are separated from one another by the two GDEs—the cathode GDE-K and the anode GDE-A. At least one fluid medium (liquid or gaseous) flows through all three chambers, with the cathode space I and the anode space III advantageously comprising essentially only gas.

In the cathode space I, which is on the side of the cathode gas diffusion electrode GDE-K remote from the counter-electrode or salt bridge space II, the reactant E-K that serves as substrate for the cathode, for example $CO_2$ and/or for example also CO, is introduced. The products P-K of the electrochemical conversion on the cathode side, provided that they are gaseous, are removed from this chamber. This is also true of products of competing reactions, for example $H_2$.

The anode space III serves as flow chamber for the gaseous reactants E-A and products P-A of the anode GDE-A. Since the anode reaction, like the cathode reaction too, is subject to no further restriction within the scope of this invention, either the corresponding gas inlet or the gas outlet, especially at the anode, may be unnecessary. In the case of $O_2$ production at the anode, for example, no gas inlet would be required since $O_2$ can form through water oxidation ($H_2O - 2e^- \rightarrow 2H^+ + \frac{1}{2}O_2$).

In the salt bridge space II, there is an electrolyte containing at least one liquid component that is pumped in circulation, for example, from a reservoir R. It serves firstly for transport of the charge carriers in the cell and secondly for cooling of the electrodes. In particular embodiments of the GDE electrodes, the liquid portion of the electrolyte may contain dissolved traces of the gaseous products and should in that case be degassed.

The presence of gases in the salt bridge space II is not ruled out, especially when they form as a result of chemical reactions in the electrolyte, for example when $HCO_3^-$ that may originate from the $CO_2$ electrolysis reacts with protons from the electrolyte.

While FIG. 2 shows a construction in which the electrolyte is pumped out of the reservoir R from below into the electrolysis cell, the electrolyte can also be introduced into the electrolysis cell from the top, as is the case in falling-film electrodes as shown by way of example in DE 199 54 247 C2. This means that no hydrostatic pressure occurs in the operation of the cell. The outlet or the removal device from the salt bridge space is advantageously backup-free, for example with a thick conduit and corresponding volume. The inlet or the feed device to the salt bridge space is advantageously configured such that the liquid, under its own weight, runs through the salt bridge space, for example in the form of a gap. This cell design is especially advantageous when tall cells>1 m are considered, and especially when no gas is formed in the salt bridge space, as is possible with the present electrolysis cell and the present methods.

Illustrative configurations with falling-film electrodes are shown in FIG. 3 and in FIG. 4. While the structure in FIG. 3 corresponds to that in FIG. 2—apart from the electrolyte supply in falling-film electrodes to the salt bridge space II, as described above—FIG. 4 shows an illustrative case in which no reactant inlet and no reactant feed is provided on the anode side, where, for example, the product gas from the anode P-A is formed from the electrolyte in the salt bridge space II, for example in a water electrolysis. The reactant gas specified on the cathode side, by way of example, is $CO_2$, although another reactant gas such as CO, mixtures of $CO_2$ and CO, etc., is possible. Since water is consumed in this construction, external water supply is required (not shown).

Figure 5:
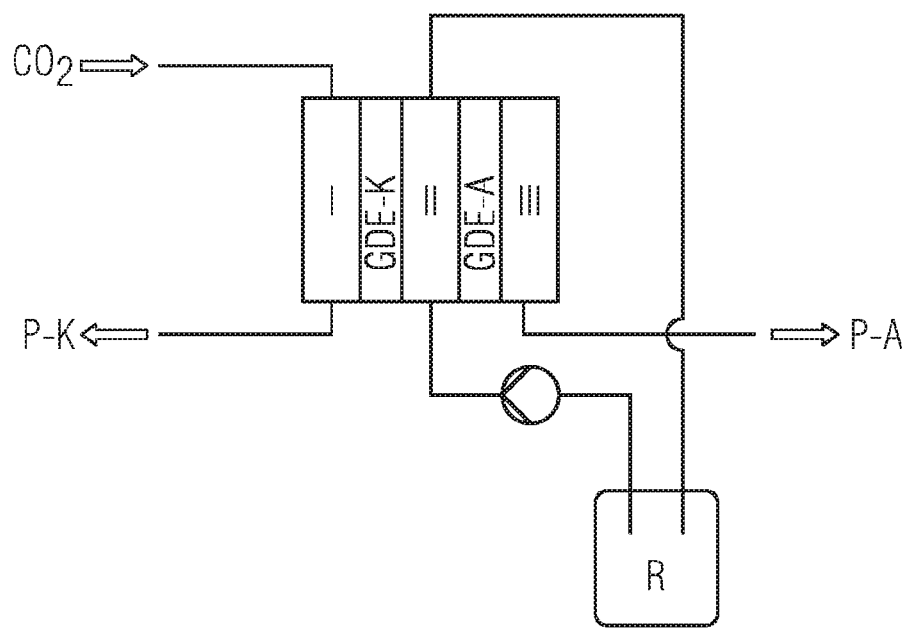
FIG. 5 shows a schematic of an electrolysis cell used in an example of the present invention.

A further illustrative embodiment is shown in FIG. 5, which is also employed in an inventive example, and which corresponds to the cell shown in FIG. 4 apart from the electrolyte supply (as in FIG. 2).

Also disclosed is an electrolysis system comprising the electrolysis cell of the invention. The corresponding embodiments of the electrolysis cell, and also further illustrative components of an electrolysis system of the invention, have already been discussed above and are thus also applicable to the electrolysis system of the invention. In particular embodiments, an electrolysis system of the invention comprises a multitude of electrolysis cells of the invention, although it is not ruled out that other electrolysis cells are present in addition.

In particular embodiments, the electrolysis system of the invention further comprises at least one recycle device, for example one each for the electrolyte in the salt bridge space, the anode space and/or the cathode space, connected to a drain from the salt bridge space and/or the anode space and/or the cathode space and a feed to the salt bridge space and/or the anode space and/or the cathode space, which is set up to guide a reactant from the cathode reaction that can be formed in the salt bridge space and/or can escape from the cathode space and/or anode space (including as unconverted reactant) back into the cathode space, optionally after purification. Corresponding considerations are also possible for a reactant in the anode space with a recycle device to the anode space, according to the reaction. The individual recycle devices are not particularly restricted and can be implemented, for example, by conduits, pipes, etc., provided that they are suitable for recycling the corresponding reactants and/or products on the anode side and/or cathode side—advantageously essentially gases—and/or the electrolyte with any products formed.

In particular embodiments, the electrolysis system of the invention further comprises an external device for electrolyte treatment, especially an apparatus for removal of dissolved gases, with which the electrolyte in the salt bridge space in particular can be treated in order to remove, for example, gases such as $CO_2$ or $O_2$, and hence enable recycling of electrolyte in the salt bridge space. In particular embodiments, the electrolysis system of the invention comprises a recycle device for the electrolyte, which is connected to the third feed device for an electrolyte and the third removal device for an electrolyte and is designed to recycle the electrolyte after it has passed through the electrolysis cell. In particular embodiments, the recycle device for the electrolyte comprises a device for electrolyte treatment and/or a feed for fresh electrolyte which is set up to supply fresh electrolyte to the recycled electrolyte to compensate for electrolyte losses in the system.

By comparison with existing electrolysis systems, a present electrolysis system can manage with much less "periphery" such as pumps, phase separators, etc.

In yet a further aspect, the present invention relates to the use of an electrolysis cell of the invention or of an electrolysis system of the invention that may also comprise a multitude of electrolysis cells of the invention for electrolysis of $CO_2$ and/or CO.

The present invention additionally relates to a method of electrochemical conversion of at least one reactant gas in an electrolysis cell of the invention or an electrolysis system of the invention, wherein at least one reactant gas is supplied to a cathode space and/or anode space of the electrolysis cell. In such a method, it is also possible for at least one product gas to form from an electrolyte in the salt bridge space and/or be removed from the cathode space and/or anode space; in other words, it is possible to supply both a reactant gas to the cathode space and/or anode space of the electrolysis cell, e.g. $CO_2$ and/or CO to the cathode space, and at the same time to obtain a product gas from the electrolyte in the salt bridge space and/or to remove it from the cathode space and/or anode space, for example $O_2$ from the anode space in the case of water electrolysis with water as electrolyte. It is of course also possible, for example, for a product insoluble in the electrolyte of the salt bridge space to form, which is then removed via the cathode space and/or anode space, for example as a gas or liquid or, as the case may be, also in solid form (for example depending on the electrolysis temperature). The two methods of the invention are accordingly not mutually exclusive, but can instead supplement one another. In addition, it is of course also possible to supply at least one reactant gas both to the cathode space and to the anode space.

In particular embodiments, at least one reactant gas is $CO_2$ and/or CO and is supplied to the cathode space. On the anode side, for example, chlorine can be prepared from HCl or $O_2$ from water, etc., and the anode reaction is not particularly restricted, such that embodiments with or without a feed device or with or without a removal device on the anode side are conceivable here, where at least one feed device or removal device is present. On the cathode side, there is at least one feed device for $CO_2$ and/or CO.

A further aspect of the present invention relates to a method of producing at least one product gas in an electrolysis cell of the invention or an electrolysis system of the invention, wherein at least one product gas is produced from an electrolyte in the salt bridge space and removed from the cathode space and/or anode space. In this method, for example, a feed device on the cathode side and/or anode side is not necessarily required, for example in the production of $H_2$ or $O_2$ from water as a constituent of the electrolyte in the salt bridge space. In particular embodiments, a method of the invention, however, is not a water electrolysis under acidic conditions since the cell is too complex for that. The method of the invention, however, is also suitable for an alkaline water electrolysis. If the method of the invention is executed as an alkaline water electrolysis, the use of the two gas diffusion electrodes (GDE) in the electrolysis cell of the invention which are employed in the method of the invention and which may both contain nickel-based catalysts here, for example, may constitute a significant improvement over the grid and perforated sheet electrodes that are currently in common use. Such a GDE-alkali electrolyzer may be operated here at higher current densities, since there would be no need for the insulation of the electrode structures by reaction gases and the additional electrical resistance of a diaphragm.

The methods of the invention may be performed with the electrolysis cell of the invention and the electrolysis system of the invention, and so aspects, configurations and embodiments described in this regard also relate to the present methods.

The electrolyte in the salt bridge space is not particularly restricted in the methods of the invention, provided that it does not damage the electrodes, permits charge transport and contains at least one liquid component. For example, a combination of liquid and solid electrolytes is also possible, as specified, for example, in DE 10 2017 223 521.7 and US 2017/037522 A1, to which reference is made with regard to the electrolyte.

In particular embodiments, the electrolyte in a method of the invention, especially in the second method with the production of at least one product gas, comprises water. In particular embodiments, the salt bridge space is essentially completely filled and advantageously fully filled with electrolyte.

In particular embodiments, the electrolyte is recycled to the electrolysis cell after passing through the electrolysis cell. It is especially advantageous here that the two gas diffusion electrodes can sufficiently protect the electrolyte from contamination, and hence the electrolyte can be reused even without an excessively complex purification. It may be the case, however, that the electrolyte is indeed purified. Nor is it ruled out that electrolyte losses, for example including through reaction of the electrolyte, are replaced in the recycling operation.

In particular embodiments, the anode space and the cathode space in the method of the invention have essentially no liquid, advantageously no liquid, which can be brought about, for example, by appropriate layers in the gas diffusion electrodes. In this way, it is especially possible to configure recycling cycles on the anode side and/or cathode side in a simpler manner, for example with regard to corrosion protection.

A $CO_2$ electrolysis in the dual GDE cell shown in FIGS. 2 and 5 is set out hereinafter as an example of a method of the invention.

In the $CO_2$ electrolysis, $CO_2$ is supplied via the cathode space I to the cathode GDE as reactant gas E-K, which is advantageously converted to gaseous products, for example in the active layer thereof. For example: $3CO_2+H_2O+2e^- \rightarrow CO+2HCO_3^-$ The gaseous product can be released back into the cathode space I on the side of the cathode GDE remote from the counterelectrode.

Anions produced as a by-product can be released into the electrolyte of the salt bridge space II.

The reaction at the anode is subject to no further restriction.

In the simplest case, it is possible, for example, i.e. when the anode is not provided with any gaseous substrate in the chamber III (as shown in FIG. 5) and the charge transport pathway is not altered by charge transport layers on one (or both) of the GDEs, for the charge carriers generated at the cathode (and also water) to be broken down: $4HCO_3^- \rightarrow O_2 + 4CO_2+4e^-$ This case is also shown in the working example.

Alternatively, in a configuration shown in FIG. 2, $Cl_2$ can be produced from HCl.

A 3-chamber cell concept and a mode of operation of this cell are disclosed, these being achievable without any higher—further—development work, which do not require any separators such as membranes and diaphragms and may therefore also include only a single electrolyte circuit.

The above embodiments, configurations and developments can, if viable, be combined with one another as desired. Further possible configurations, developments and implementations of the invention also include combinations that have not been mentioned explicitly of features of the invention that have been described above or are described hereinafter with regard to the working examples. More particularly, the person skilled in the art will also add individual aspects to the respective basic form of the present invention as improvements or supplementations.

The invention is elucidated further in detail hereinafter with regard to various examples thereof. However, the invention is not limited to these examples.

Example 1: This working example illustrates the mode of function of a dual GDE cell. The test setup shown in schematic form in FIG. 5 was used.

The construction shown in FIG. 5 corresponds to that shown in FIG. 2, except that the gas inlet E-A on the anode side has been removed since no gaseous anode substrate was supplied.

The composition of the anode was as follows:
 gas diffusion layer: H23C2 carbon GDL from Freudenberg
 catalyst coating: 2 mg/cm$^2$ $IrO_2$, 0.3 mg/cm$^2$ Nafion as binder The cathode had the following composition:
 gas diffusion layer: porous PTFE-filled silver mesh
 catalyst coating: 26% by weight of PTFE/74% by weight of silver, roller-applied film For the cathode, the following gas flow rates and current densities of $CO_2$ were established:
 100 mA/cm$^2$|1 A:60 ml/min
 200 mA/cm$^2$|2 A:120 ml/min
 300 mA/cm$^2$|3 A:180 ml/min As shown in FIG. 5, the construction does not contain any separators. Ion transport and charge carrier creation layers on the electrodes were also dispensed with, since no gastight layers are required for the operation of such a cell and appropriate separation of the product gases can nevertheless be assured. Both the GDEs, as set out, have a two-layer construction and each contain a gas diffusion layer and an active layer. The active layer of the cathode contains a silver catalyst, and that of the anode an $IrO_2$ catalyst.

At the gas inlet of the cathode space I, $CO_2$ was introduced with a 7-fold excess ($\lambda=8$) with respect to the current density applied, in accordance with values for complete production of CO at the given current intensity. The product gases from the two spaces I and III, after passing through the cell once, were collected in separate gas pouches and analyzed by gas chromatography.

In addition, the pH of the electrolyte was monitored continuously.

The distance between the electrodes was 6 mm. The active area of the two GDEs was 10 cm².

First of all, a two-hour preliminary experiment was conducted in order to determine the self-setting pH of the electrolyte. The starting electrolyte used was 1M $K_2CO_3$ in distilled water. Since a continuous shift in the pH to the neutral was observed, later on in the experiment, 2M $KHCO_3$ in distilled water was used as electrolyte, pumped in circulation at 120 ml/min.

Figure 6:
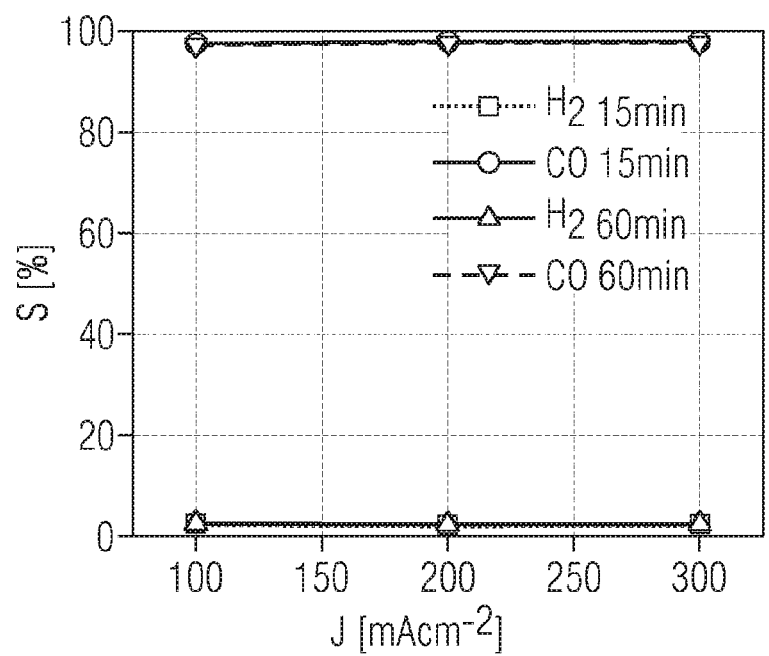
FIGS. 6 to 10 show results that have been obtained in an inventive example.

In order to demonstrate the functionality of the dual GDE cell, one one-hour $CO_2$ electrolysis each was conducted at current densities J of 100, 200 and 300 mA/cm². After 15 and after 60 min, the composition of the cathode-side and anode-side product gases was measured. The electrolyte was changed before each experiment. FIG. 6 shows the selectivities S ascertained for CO and $H_2$ in the dual GDE cell. As can be seen in FIG. 6, the dual GDE cell is suitable for $CO_2$ reduction, and it is possible to achieve very good selectivities.

Figure 7:
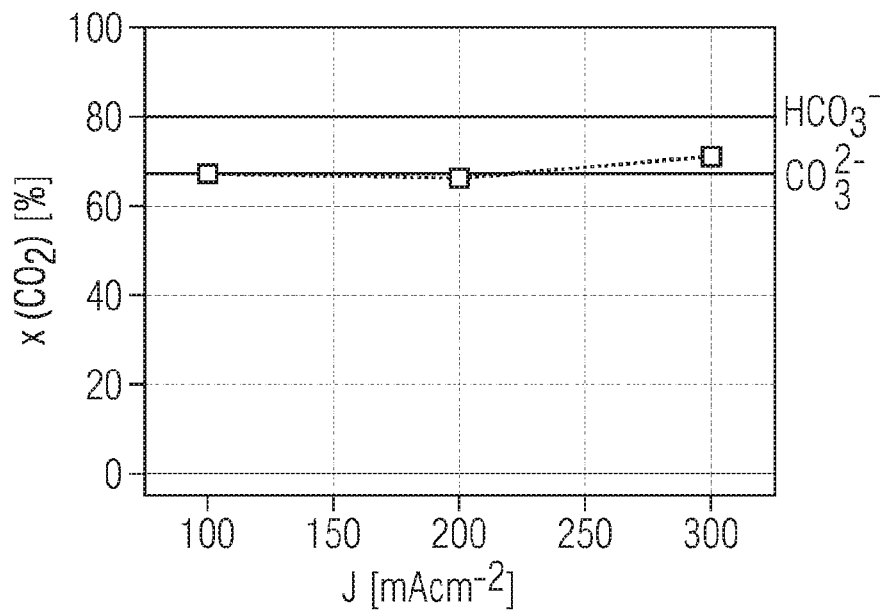

FIG. 7 shows the $CO_2$ content $x(CO_2)$ in % by volume in the anodic product gas (remainder: $O_2$), which is in the region of the production expected in the case of transport of $CO_3^{2-}$ and $HCO_3^-$ ions formed at the cathode (between about 67% and 80%).

Figure 8:
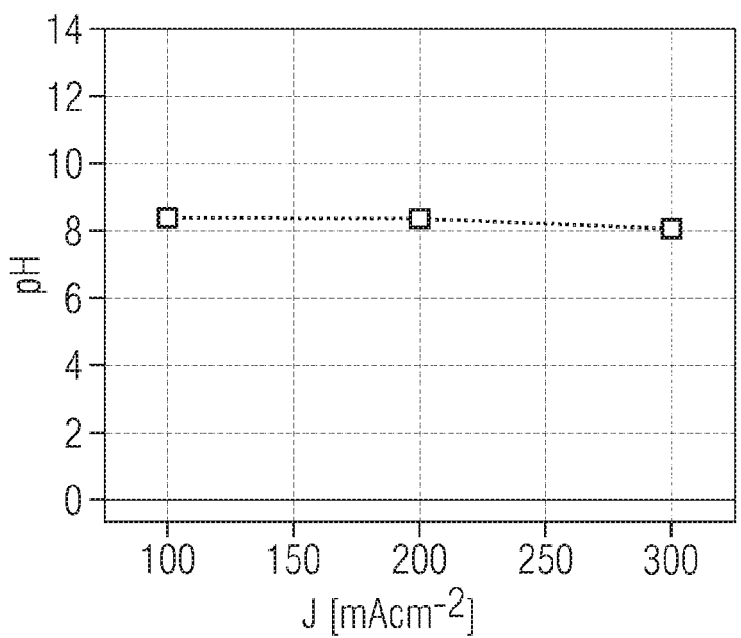

FIG. 8 shows the average values of the electrolyte pH at the current densities tested.

As elucidated above, the anions generated by the cathode are broken down at the anode if there are no charge transport layers present on the electrodes, nor is there a gaseous anode substrate. In this case, the composition of the anode gas suggests carbonate $CO_3^{2-}$ as the main by-product from the cathode.

The net reaction equation at the cathode here is thus:
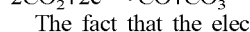
$2CO_2 + 2e^- \rightarrow CO + CO_3^{2-}$ The fact that the electrolyte pH was nevertheless 8-8.5 suggests physical saturation of the electrolyte with $CO_2$. At higher current densities, isolated formation of gas bubbles in the feeds and in the electrolyte vessel was observed. It should be noted in this regard that the release of $CO_2$ at the anode can be prevented, for example, by the introduction of ion transport layers, for example at the anode.

Figure 9:
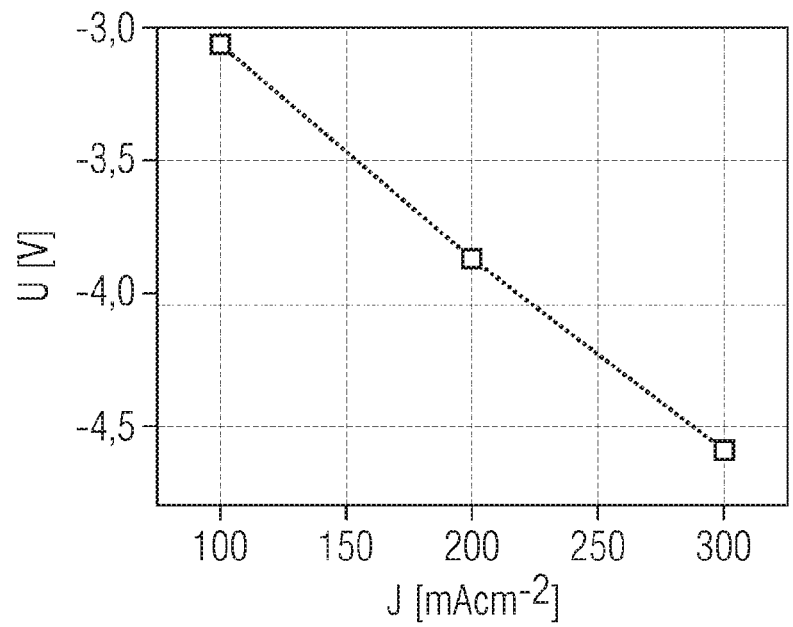

FIG. 9 shows the cell voltage U in the electrolysis cell as a function of current density.

A linear fit of these data gives a point of intersection with the Y axis at −2.31 V and an approximate ohmic cell resistance of 0.77Ω. For an electrode separation of 2 mm which is more realistic for application purposes, at 300 mA/cm⁻², a cell voltage of −3.1 V would be expected. In the event of a change in temperature from 25° C. to 60° C., as would be expected from a stack electrolyzer, the conductivity of the electrolyte rises from 120 mScm⁻¹ to 200 mScm⁻¹. In this case, cell voltages around −2.8 V would be expected.

In order to demonstrate the effective separation of the product gases by the GDEs, the anode gas was analyzed for traces of cathodic product gases.

Figure 10:
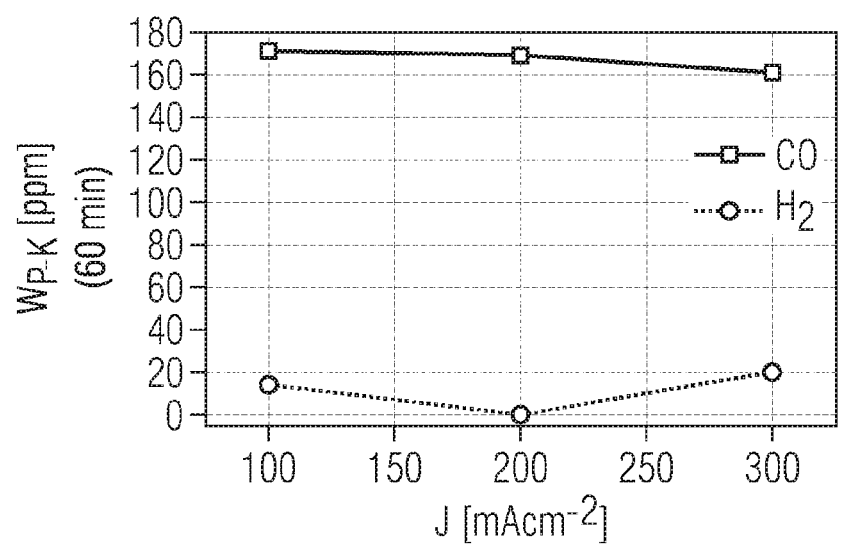

FIG. 10 shows traces of cathodic products $W_{P-K}$ found in the anodic product gas, although the $H_2$ values were at the lower sensitivity limit of the detectors and are therefore subject to error.

The traces of the cathodic products found in the anodic product gas are below 200 ppm. Thus, this simple dual GDE cell is equivalent to the construction shown in FIG. 1 with two electrolyte circuits composed of a common reservoir and diaphragm. Since the concentration is not dependent on the current density, cross-contamination probably occurs physically as a result of gases dissolved in the electrolyte, and could therefore be suppressed by degassing the electrolyte stream (for example with ultrasound).

It is also therefore advisable, in order to maintain the gas separation, that the salt bridge space II is fully filled with electrolyte, since GDEs are not necessarily designed to separate two gas spaces from one another.

With this invention, a general new cell concept is presented, that can avoid the mixing of different phases in the electrolyzer specifically through use of two gas diffusion electrodes. As a result, the currently customary use of separators, such as membranes, is also superfluous.

The invention claimed is:

1. An electrolysis cell, comprising:
a cathode space comprising a cathode;
an anode space comprising an anode;
a salt bridge space disposed between the cathode and the anode,
wherein the cathode space and the salt bridge space are delimited from one another by the cathode, and the salt bridge space and the anode space are delimited from one another by the anode, and the cathode and the anode take the form of a gas diffusion electrode, wherein the salt bridge space has no separator, and wherein the cathode and the anode have no separator on a salt bridge space side,
a first feed device comprising a source of a first reactant gas which is connected to the cathode space and is designed to supply the cathode space with the first reactant gas, wherein the first reactant gas comprises CO2, CO, or mixtures thereof, and
a first removal device for a first product gas which is connected to the cathode space and is designed to remove the first product gas from the cathode space,
wherein the electrolysis cell optionally comprises a second feed device for a second reactant gas which is connected to the anode space and is designed to supply the anode space with the second reactant gas,
wherein the electrolysis cell optionally comprises a second removal device for a second product gas which is connected to the anode space and is designed to remove the second product gas from the anode space,
wherein the electrolysis cell further comprises: a third feed device which comprises a source of an electrolyte and which is designed to supply the cathode and the anode in the salt bridge space with the electrolyte, and a third removal device for the electrolyte which is designed to remove the electrolyte from the salt bridge space, and
wherein the cathode comprises a multilayer cathode comprising: an active layer comprising an electrocatalyst, wherein the electrocatalyst is based on Ag or Au and/or compounds thereof, and wherein the active layer is locally hydrophobically modified on the salt bridge space side; and a layer that is hydrophobic and non ion conductive on a cathode space side.

2. The electrolysis cell as claimed in claim 1, wherein the anode comprises an active layer comprising an electrocatalyst, wherein the electrocatalyst comprises $IrO_2$.

3. The electrolysis cell as claimed in claim 2, wherein the anode on the anode space side comprises a layer that is hydrophobic, not electrochemically active, not ion-conductive, and is a thickest layer of the anode.

4. The electrolysis cell as claimed in claim 1,
wherein the anode comprises a layer that is non ion conductive and hydrophobic on an anode space side.

5. The electrolysis cell as claimed in claim 1,
wherein the cathode and/or the anode each comprise a porous layer comprising an ion exchange material on the salt bridge space side.

6. The electrolysis cell as claimed in claim 5,
wherein the porous layer on the cathode contains an anion exchanger and/or the porous layer on the anode contains a cation exchanger.

7. The electrolysis cell as claimed in claim 1,
wherein metal of the electrocatalyst is based solely on Ag or Au and/or compounds thereof.

8. The electrolysis cell as claimed in claim 1,
wherein the electrocatalyst comprises a hydrophobic binder.

9. An electrolysis system, comprising:
an electrolysis cell as claimed in claim 1.

10. The electrolysis cell as claimed in claim 1, further comprising the second removal device for the second product gas which is connected to the anode space and is designed to remove the second product gas from the anode space.

11. The electrolysis cell as claimed in claim 10, further comprising the second feed device for the second reactant gas which is connected to the anode space and is designed to supply the anode space with the second reactant gas.

12. The electrolysis cell as claimed in claim 1, wherein the electrolysis cell is configured so that the first reactant gas is the only reactant gas fed to the cathode space.

13. A method of electrochemical conversion of the first reactant gas in an electrolysis cell as claimed in claim 1, the method comprising:
supplying the first reactant gas to the cathode space of the electrolysis cell.

14. The method as claimed in claim 13,
wherein the anode space and the cathode space have essentially no liquid.

15. A method of producing at least one product gas in an electrolysis cell as claimed in claim 1, the method comprising:
producing at least one product gas from an electrolyte in the salt bridge space and removing the at least one product gas from the cathode space and/or the anode space.

16. An electrolysis cell, comprising:
a cathode space comprising a cathode;
an anode space comprising an anode;
a salt bridge space disposed between the cathode and the anode,
wherein the cathode space and the salt bridge space are delimited from one another by the cathode, and the salt bridge space and the anode space are delimited from one another by the anode, and the cathode and the anode take the form of a gas diffusion electrode, wherein the salt bridge space has no separator, and wherein the cathode and the anode have no separator on a salt bridge space side,
a first feed device comprising a source of a first reactant gas which is connected to the cathode space and is designed to supply the cathode space with the first reactant gas, and
a first removal device for a first product gas which is connected to the cathode space and is designed to remove the first product gas from the cathode space,
wherein the electrolysis cell optionally comprises a second feed device for a second reactant gas which is connected to the anode space and is designed to supply the anode space with the second reactant gas,
wherein the electrolysis cell optionally comprises a second removal device for a second product gas which is connected to the anode space and is designed to remove the second product gas from the anode space,
wherein the electrolysis cell further comprises: a third feed device which comprises a source of an electrolyte and which is designed to supply the cathode and the anode in the salt bridge space with the electrolyte, and a third removal device for the electrolyte which is designed to remove the electrolyte from the salt bridge space, and
wherein the cathode comprises a multilayer cathode comprising; a porous layer that comprises an ion exchange material on a salt bridge space side.

17. The electrolysis cell of claim 16,
wherein the porous layer further comprises charge carrier creation layers.

18. The electrolysis cell of claim 16,
wherein the porous layer further comprises multiple ion exchange materials.

19. The electrolysis cell of claim 16,
wherein the porous layer further comprises pores, and wherein the ion exchange material of the porous layer is disposed solely in the pores.

20. The electrolysis cell of claim 16,
wherein the source of the electrolyte is configured to supply the electrolyte at a pH ranging from 8.0 to 8.5.

* * * * *